Patented Mar. 11, 1941

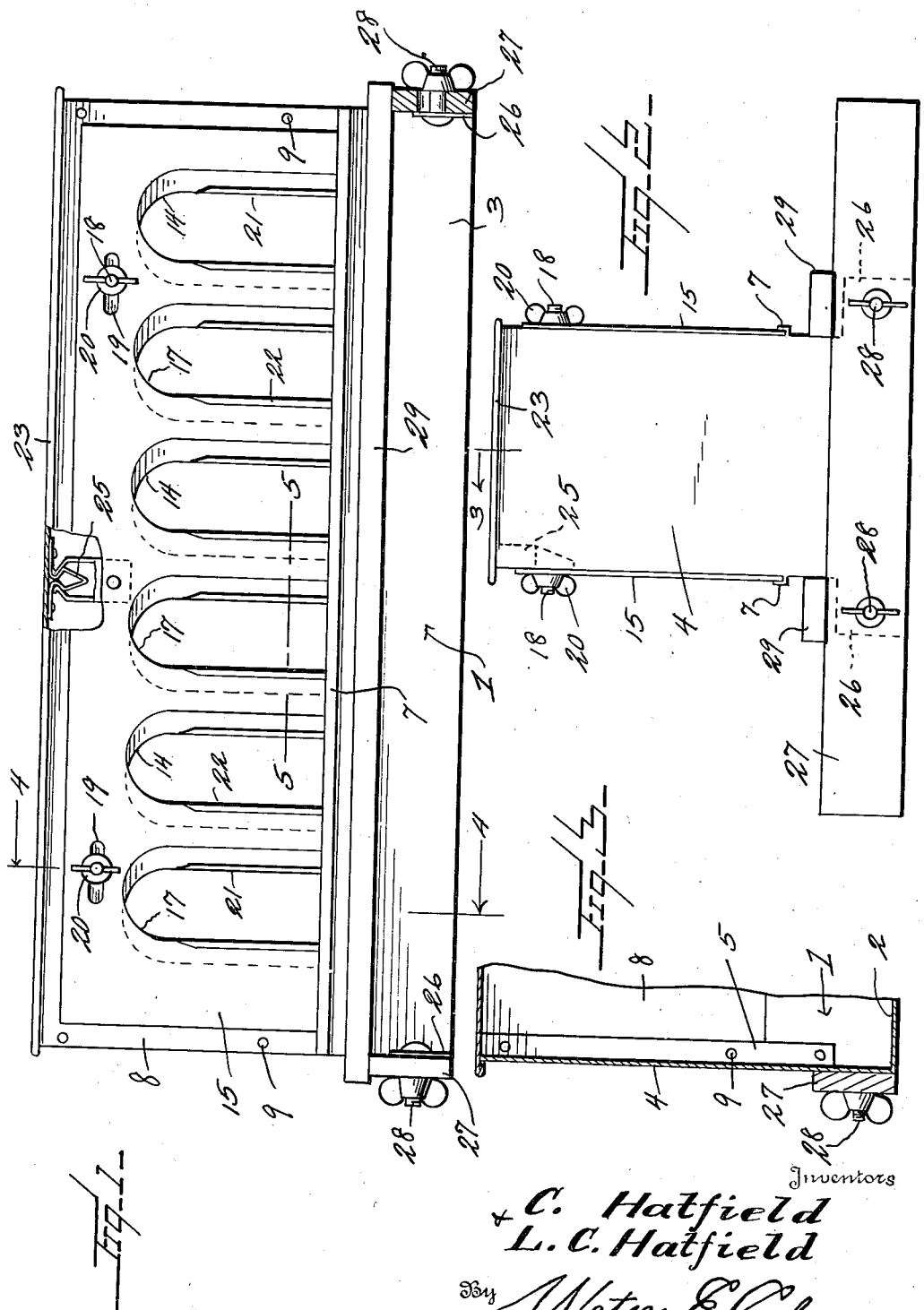

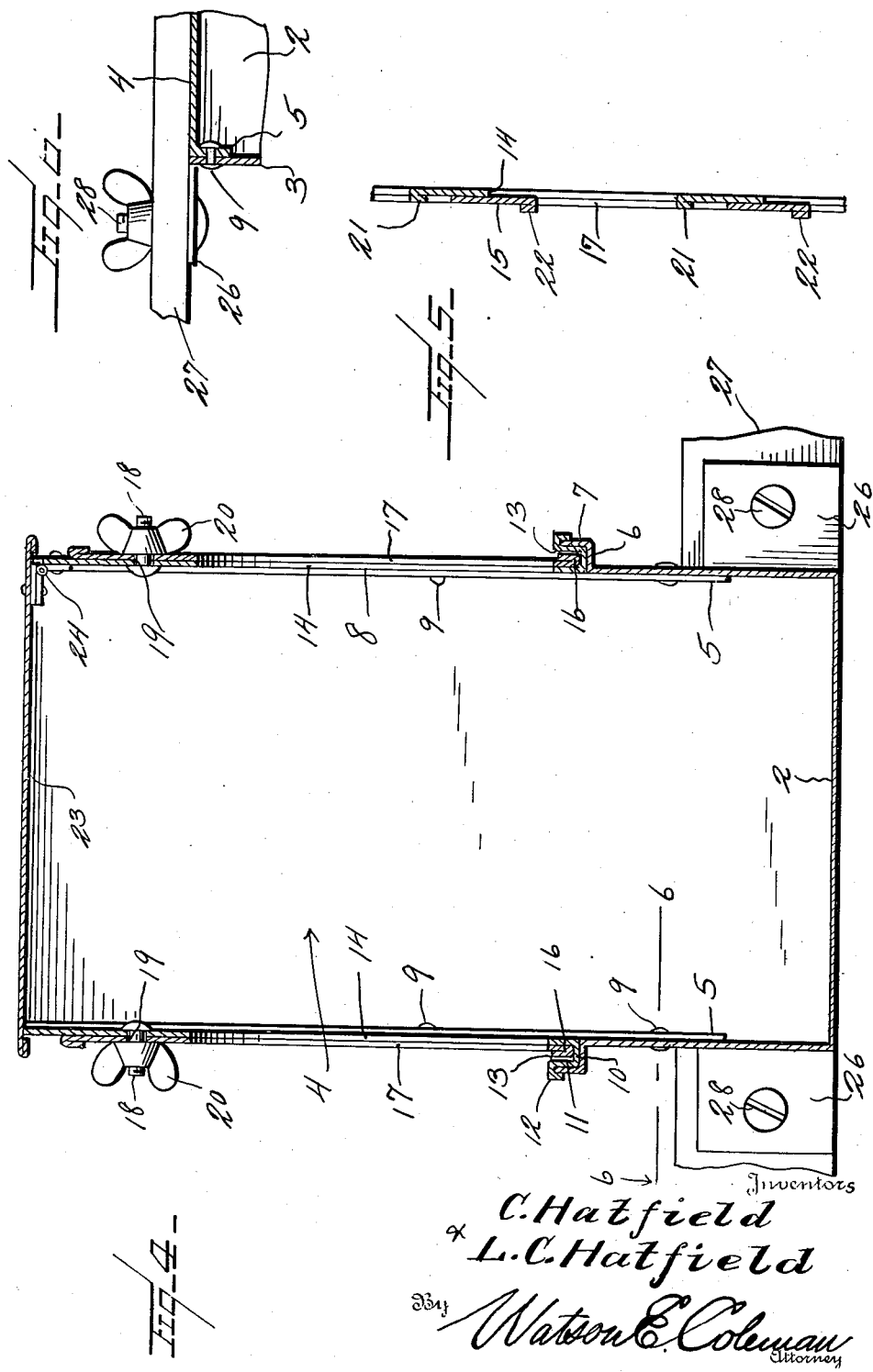

2,234,406

UNITED STATES PATENT OFFICE 2,234,406

POULTRY FEEDER

Clyde Hatfield, Helena, Mont., and Leslie C. Hatfield, Glide, Oreg., assignors of one-third to Stanley V. Hatfield, Richmond, Calif.

Application April 6, 1940, Serial No. 328,286

3 Claims. (Cl. 119—61)

This invention relates generally to the class of animal husbandry and pertains particularly to improvements in poultry feeding and watering devices.

The primary object of the present invention is to provide a novel type of adjustable poultry feed trough or poultry watering trough wherein adjustments may be made of the size of the feeding openings for such trough to adapt the same to use by young chickens or full-grown chickens as may be desired, the trough being so designed that when such adjustment has been made, the chickens will not be able to get any part of the body into the trough except the head and will, therefore, be prevented from scattering the feed or dirtying the same.

Another object of the invention is to provide an adjustable poultry feeding or poultry watering trough wherein the means for adjusting the feeding openings is of a simple character enabling the poultryman to make a desired adjustment easily and quickly and wherein also the edges of the adjustable openings are protected or guarded in such manner that the poultry cannot be injured by coming into contact therewith.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 is a view in side elevation of the feeder embodying the present invention, parts being broken away.

Fig. 2 is a view in end elevation of the same.

Fig. 3 is a sectional view on the line 3—3 of Fig. 2.

Fig. 4 is a sectional view on the line 4—4 of Fig. 1.

Fig. 5 is a horizontal section on the line 5—5 of Fig. 1.

Fig. 6 is a horizontal section on the line 6—6 of Fig. 4.

Referring now more particularly to the drawings, the feeder device is preferably constructed in the elongated rectangular form illustrated and is designed so as to provide a lower trough portion indicated generally by the numeral 1, which has the bottom wall 2, the longitudinal side walls 3 and the end walls 4. The bottom, side and end walls for the trough are formed from a single sheet of metal, the side walls being turned upwardly from the bottom wall and the end walls being turned upwardly from the ends of the bottom wall and soldered or otherwise secured to the end edges of the trough side walls to form watertight seams. It will be noted that the trough end walls extend a substantial distance upwardly beyond the top edges of the trough side walls and that the vertical edges of the extended portions of the end walls are provided with inturned flanges 5.

Each trough side wall 3 at its top edge is shaped to provide an outwardly extending horizontal portion 6 and an upwardly directed vertical portion 7, thereby forming an offset lip for the purpose hereinafter stated, this lip extending the full length of the top edge of each trough side wall 3.

Disposed above and in the plane of each side wall 3 of the trough is an auxiliary side wall or upper wall 8 which at its ends is disposed against the adjacent inturned flanges 5 of the end walls to which it is secured by rivets 9 or other suitable securing means. The top edge of each upper wall 8 is in the plane of the top edges of the end walls 4 and the lower edge of each upper wall is provided with an outwardly extending horizontal portion 10 which merges with a vertical portion 11 which in turn terminates in the reversely bent edge 12, thus forming a channel-like foot which rests in the lip of the adjacent side wall 3, the reversely bent portion covering the top edge of the vertical part 7 of this lip and acting as a shield as well as a means for holding the two wall portions in coupled relations. There is thus provided at the lower edge of each upper side wall a longitudinally extending guide channel 13.

Each of the upper side walls is provided with a series of vertically extending windows or openings 14.

Disposed against the outer side of each upper wall 8 is a slide plate 15, the lower edge of which is turned, as indicated at 16, and slidably disposed in the channel 13. Each slide plate has formed therein a number of vertically extending openings 17 corresponding in number, shape and size with the openings 14 in the adjacent wall and these openings are designed to be fully alined with the openings 14 when the slide is moved to one position or moved out of alinement with the openings 14 when the slide is oppositely moved so as to reduce the sizes of the openings 14 to a minimum. In order to maintain the slide plates 15 in position, each upper wall 8 is provided with a pair of outwardly extending screws 18, each of which extends through a longitudinal slot 19 in the slide plate to receive a wing nut 20. When the slides are moved in one direction, the screws 18 limit their movement so as to stop the opening 17 in exact register with the openings 14, thus providing openings of maximum size for the chickens to reach into the trough for food or water and when the slides are moved in the opposite direction, the screws stop the slides when the openings 14 are reduced to about half their original size. By this arrangement the openings may be adjusted for use by very young chicks or older chicks.

In order that injury may not be done to the heads of the chickens by the edges of the metal as the chickens extend their heads through the openings, the metal along one edge of each of the openings 14 is turned back upon itself, as indicated at 21, and the diagonally opposite edge of the adjacent opening 17 of the slide is likewise turned, as indicated at 22, and thus when the slide is shifted to adjusted position, these turned edges will form borders for the openings and thus protect the chickens against injury.

In order that the contents of the feeder may be protected, a top 23 is provided which is hingedly attached to one upper wall, as indicated at 24, suitable fastening means 25 being employed for retaining the top securely in position.

At each end of the lower part or trough 1 of the feeder, there is formed integrally with or secured to each end wall a laterally extending ear 26, and extending transversely of each end of the trough is a base or foot bar 27 which is preferably formed of wood and which is secured to the adjacent ears 26 by screws 28.

In order that small chicks may be able to feed easily from the trough through the openings in the upper walls, there may be provided the perch bars 29 which are supported upon the base bars 27 and extend longitudinally of each side of the trough.

From the foregoing, it will be apparent that there has here been disclosed a novel poultry feeding device which, because of its construction, may be readily employed as a watering trough as well as a feeder, and in which a novel means is employed for supporting the adjustable apertured slide by means of which regulation of the size of the feeding openings may be readily controlled.

What is claimed is:

1. A poultry feeder, comprising an elongated trough having, top, bottom, side and end walls, said side walls having upper and lower portions, one upper portion having a series of feeding openings therethrough having arched top edges, the said one upper portion having a flanged lower edge and the adjacent lower portion having a corresponding top edge flange, the flanges being locked together to form a guide groove below the said series of feeding openings, a slide plate disposed against the said one of the side walls and having its lower edge in said guide groove, said slide plate having openings corresponding in number, size, and contour to the said feeding openings, and means connecting the sliding plate at its top with the upper part of the said upper side wall portion whereby limited sliding movement of the slide plate is had to move the openings of the wall and of the plate into full registry or out of registry, the said feeding openings of the upper side wall portion being bordered along one vertical edge by an inturned portion of the material of which the wall is formed, and the openings of the sliding plate being each bordered along a vertical edge diagonally opposite to the bordered edge of the adjacent wall opening by a turned portion of the material of which the plate is made, the said bordered edges of the adjacent wall and plate openings serving as guards to protect the chickens' heads against injury.

2. A poultry feeder, comprising an elongated trough body having a bottom, side, and end walls, said end walls being extended above the top edges of the side walls, each of said side walls having an outwardly and upwardly directed top edge lip, an auxiliary side wall extending throughout the length of each of the first side walls and connected at its ends to the extended end walls, each auxiliary side wall having a lower edge portion extending outwardly and upwardly over and joined with said lip, the edge portion of an auxiliary side wall and the lip with which it is joined forming a longitudinal guide groove, one of said auxiliary side walls having a plurality of vertically extending feed openings formed therethrough, a slide plate disposed lengthwise of the outer side of the said one of the auxiliary side walls and having openings corresponding in number to the said feed openings and of the same configuration for registry therewith, the lower edge of said slide plate resting in said guide groove, means connecting the top edge of the slide plate with the adjacent wall whereby the slide plate has limited movement with respect to the feeding openings of the adjacent wall, and cover means for said trough overlying the upper edges of the end walls and the upper side walls.

3. A poultry feeder comprising a trough having top, bottom, side and end walls, one of the side walls having feeding openings therethrough, means adjustably secured to the said one side wall for changing the size of said openings, an ear member integral with and extending from each end wall at the bottom thereof outwardly from the adjacent side wall, a supporting bar extending across each end wall and having a pair of ears disposed against one side thereof, means securing said pairs of ears to the adjacent bars, and a perch bar extending longitudinally of the said one side wall below said openings and supported at its ends on said supporting bars.

CLYDE HATFIELD.
LESLIE C. HATFIELD.